United States Patent

[11] 3,527,151

[72] Inventor William H. Harrison
6363 Santa Monica Blvd., Los Angeles, California 90038
[21] Appl. No. 662,141
[22] Filed Aug. 21, 1967
[45] Patented Sept. 8, 1970

[54] OPTICAL DIFFUSER
5 Claims, 6 Drawing Figs.
[52] U.S. Cl. .................................................. 95/65, 355/125
[51] Int. Cl. .................................................. G03b 11/00
[50] Field of Search .................................... 95/65; 355/125, 126

[56] References Cited
UNITED STATES PATENTS

| 1,254,579 | 1/1918 | Collet | 95/65 |
| 2,246,561 | 6/1941 | Wheelan | 355/125X |
| 2,972,931 | 2/1961 | Roob | 95/65X |

*Primary Examiner*—John M. Horan
*Attorney*—Fulwider, Patton, Rieber, Lee and Utecht ABSTRACT: An optical filter intended to be attached to the lens of a camera, which forms a vignette of the portrait being taken. The filter includes a clear section which transmits the image of the subject, and a diffusing section that acts outside of the image area to diffuse the image to the point where it becomes an overall color or shade.

Patented Sept. 8, 1970
3,527,151
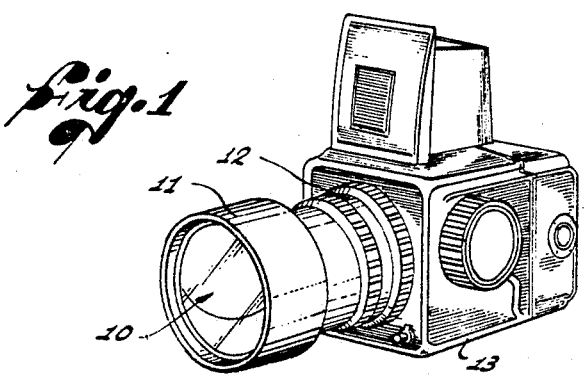
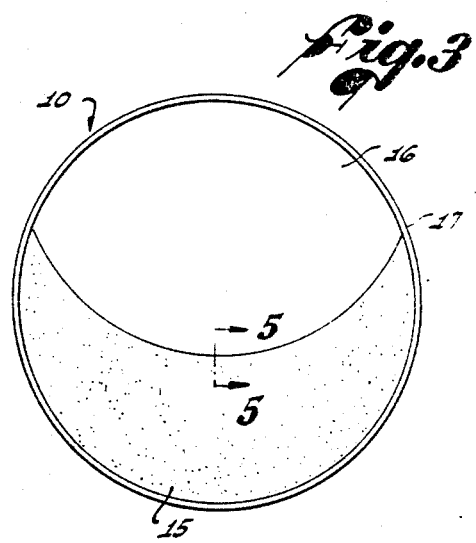
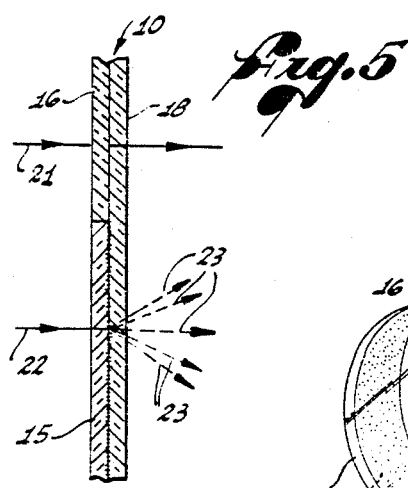
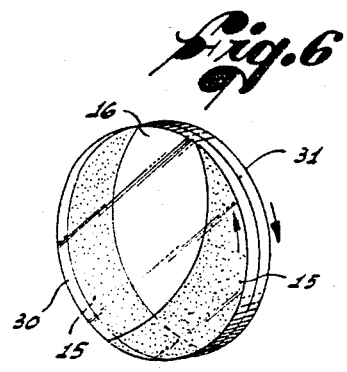
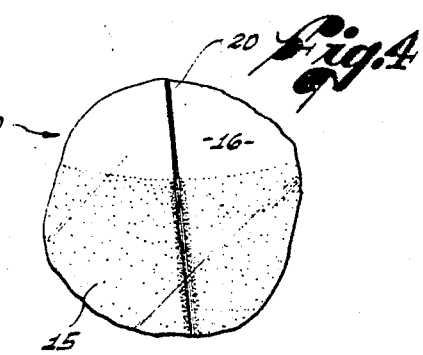
INVENTOR.
WILLIAM H. HARRISON
BY Fulwider, Patton, Rieber,
Lee, and Utecht
ATTORNEYS

OPTICAL DIFFUSER

BACKGROUND OF THE INVENTION

1. Field of the Invention

This invention relates to the field of photography, and more particularly to the field of portrait and special effect photography.

2. Description of the Prior Art

In photography, and particularly in portraiture, it is often desirable to focus the attention of the observer on a particular area, such as the face of the subject, and to reduce or eliminate extraneous distracting areas. Many different means have been used to achieve these results, but one of the simplest and most enduring is to form the portrait as a vignette, in which the head and upper portion of the neck are relatively sharply defined, and the image then, as the observer's eye moves downward, diffuses to the point where there is no detail, but only an overall color or shade.

Heretofore, the vignette has usually been formed by locating a matte or baffle in front of the camera between the lens and the subject, and photographing the subject through or over the top of the matte. Generally the matte has an upper edge formed as the arc of a circle, and notched to provide a series of relatively long tapered fingers pointed at their upper ends and broadening to wide bases that joined the corresponding bases of the adjacent fingers. This generally serrated edge was located so as to be out of focus when the subject was focused on the film, and the result of the serrated edge was to provide a gradual elimination of the image of the subject. By lighting the surface of the matte so that it approached the lighting of the background, the effect was that of a portrait including a head with the lower portion of the neck, etc., fading away to a uniform color or shade approaching that of the background.

The location of the matte and the balancing of the lighting on it have long presented problems to photographers. Furthermore, the mounting of the matte whose serrated or feathered edge provides the diffusion, has also presented problems. Since the matte must act to block out or remove some of the image, it must be spaced from the lens, lest its only effect be that of reducing the amount of exposure of the film. Additionally, since it must be out of focus, it must be spaced a considerable distance from the plane on which the lens is focused. These requirements have meant that the usual vignette matte has been mounted on a separate stand between the camera and the subject, which was always subject to being knocked over, wrongly positioned, etc., or mounted upon an arm extending out from the bed of the camera. This latter form of mounting obviously had disadvantages, including limitations on the positioning of the matte, and the upsetting of the mechanical balance of the camera on its support.

While the present invention is here described as it pertains to studio portraiture, it will be apparent that the invention may be used in many other fields including, without limitation, motion picture and television photography, and non-portrait work.

SUMMARY OF THE INVENTION

The present invention overcomes the difficulties of the prior art by providing an optical filter composed of a diffusing section and a non-diffusing section, the filter conveniently being mounted upon the lens barrel or housing of the camera lens, and spaced from the front element of the lens a relatively short distance, e.g., a distance of three inches or less for lenses of conventional focal length. The light transmissions of the diffusing and non-diffusing portions are balanced to meet the particular requirements, and two or more filters may be used simultaneously and, if desired, rotated with respect to each other to provide special effects.

DESCRIPTION OF THE DRAWINGS

In the drawings, FIG. 1 illustrates a camera of any suitable type equipped with the vignette filter of the present invention.

FIG. 2 illustrates the type of portrait provided by the vignette filter that is a subject of the present invention.

FIG. 3 is an elevational view of the vignette filter that constitutes this invention.

FIG. 4 is an elevational view of an enlarged fragment of the filter shown in FIG. 3, the section being taken at the junction of the diffusing and non-diffusing portions of the filter, and illustrating the appearance of a dark line across a light background immediately behind the filter.

FIG. 5 is an enlarged cross-sectional view of a fragment of the filter taken on the line 5—5 of FIG. 3 and showing the passage of light rays through both the diffusing and the non-diffusing portions of the filter.

FIG. 6 is a perspective view indicating how a pair of filters may be used and rotated with respect to each other to produce different results.

Referring to the drawings and particularly FIG. 1 thereof, the filter of the present invention comprises a filter assembly 10, used in a special filter holder 11 that in turn is mounted upon the lens barrel 12 of a camera 13. As will become apparent, the camera 13 may be almost any type of camera, but is generally one having a ground glass or focusing screen, such as a studio camera or a single lens reflex camera such as, but not limited to, the general type illustrated. The filter holder 11 mounts on the lens barrel 12 of the camera 13 primarily for convenience, though it could be otherwise supported, should this be desirable, in some other manner that maintains it stationary with respect to the front element of the lens. The conventional filter holder, in which the filter is held as close to the front element of the lens as practical, usually does not secure the maximum effectiveness of the filter 10, and hence the special filter holder 11 is intended to hold the filter 10 a moderate distance, for example, a distance up to approximately 75 millimeters from the front surface of the lens. This value will be affected by the focal length of the lens, the lens stop, etc.

As shown in FIG. 3, the vignette filter 10, preferably of circular form, includes a diffusing portion 15 and a non-diffusing portion 16. The filter 10 is preferably of a laminated construction as hereinafter described, and the edges preferably are protected by a mounting ring 17 usually formed of metal. Circular filters of laminated construction enclosed within a metal ring have been known and used for many years, but the use of both a diffusing portion and a non-diffusing portion in a single filter assembly as here proposed is new.

The boundary between the diffusing portion 15 and the non-diffusing portion 16 is preferably an arc of a circle, as indicated in FIG. 3, and the construction of the filter assembly 10 is indicated in some detail in FIG. 5.

As seen in FIG. 5, the diffusing portion 15 comprises a piece of optical glass having a smooth outer surface and a roughened inner surface. The roughening of the inner surface may be accomplished by any suitable means, such as etching, grinding, or sandblasting, and should be to a degree sufficient to prevent the formation of a recognizable image by a ray of light passing through this diffusing section. The non-diffusing portion 16 comprises a piece of optical quality glass abutting the diffusing portion 15, and both the front and rear surfaces of the non-diffusing portion 16 should be without blemishes or aberrations that would tend to distort the image. The diffusing portion 15 and the non-diffusing portion 16 are cemented to a supporting sheet 18 that strengthens the diffusing and non-diffusing portion, as well as protecting the roughened surface of the diffusing section. It will be appreciated, of course, that while the roughened surface of the diffusing portion 15 is sufficient to prevent the formation of an image on the image plane, the roughness is not so great as to prevent the viewing of an object immediately adjacent the diffusing section. Thus, FIG. 4 represents the effect that will be seen when a filter assembly 10 is placed upon a surface, such as a piece of white paper, having a black line extending across it. The line 20 is sharply defined and clearly seen through the non-diffusing portion 16, but is much less sharply seen, and is diffused when viewed through the diffusing portion 15. A translucent section, such as might be provided by a piece of opal or flashed opal glass would provide too much diffusion, and the line 20 would generally not be visible through the opal or flashed opal glass. This excess of diffusion is undesirable.

As seen in FIG. 5, when a light ray 21, illustrated as going from left to right, enters the non-diffusing portion 16 of the filter assembly 10, it passes through that portion and the supporting member 18 without substantial diffusion. It will be understood that the light ray then enters the lens of the camera 13 and is focused upon the film plane within the camera, in the conventional manner.

A second ray 22, likewise shown passing from left to right, passes through the diffusing portion 15 and is diffused by the roughened rear surface of the diffusing portion and thus emerges from the supporting plate 18 as a number of rays 23 of scattered light. The scattered rays 23 pass on toward the lens of the camera 13, but cannot be focused upon the film plane to form an image as the non-diffused ray 21 can. Since the filter assembly 10 is relatively close to the lens of the camera 12, and is thus out of focus, the dividing line between the diffusing portion 15 and the non-diffusing portion 16 will not be seen on the image formed on the film, but instead, the dividing line will be softened or spread over an area extending from the sharply focused part of the image formed by the rays 21, to the completely diffused area formed by the diffused rays 23. An example of a picture formed by such a filter is shown in FIG. 2, where it will be seen that the eyes, nose, and mouth of the subject are sharply in focus, these representing the critical portions of the portrait, while the lower portion of the portrait is gradually diffused into a complete absence of image. No sharp line dividing the diffused and the non-diffused portions is seen, and it will be appreciated that by reason of the optics of the arrangement, certain of the diffused rays 23 reach the same area of the film plane that the non-diffused rays 21 reach. The proportion of diffused and non-diffused rays varies, and where the non-diffused rays are a maximum and the diffused rays are a minimum, as in the case of the facial features, the image is clear and sharp. Where the diffused rays 23 predominate, the diffusion is much greater and a maximum is reached where only diffused rays reach the film plane, and as a result the image is eliminated.

When a picture is taken of a person in front of a white background, it is desirable to have the lower portion of the portrait fade into a white area matching the background behind the head of the subject. When the subject is wearing grey or medium dark clothing, the diffused light rays 23 must be of a sufficiently strong intensity to overcome the lack of light reflected from the grey areas. In effect, this means that more light must be provided for the outer edge of the picture, or conversely, less light must be permitted to expose the face of the subject. Since it is a matter of proportion, the simple way to solve the problem is to decrease the amount of light passing through the non-diffusing section 16 while keeping the transmission of the diffusing section 15 near the maximum possible. It has been found that to secure best results where a white background is used, the non-diffusing section 16 should transmit approximately 50 percent of the light falling upon it, while the diffusing section 15 should transmit approximately 70 percent. It is to be clearly understood that this transmission of light is not measured immediately behind the filter assembly 10, but is instead measured at the focal plane, where the film is located. Because of the scattering of the light rays 23, measurement immediately behind the diffusing portion 15 will not give a reading having value for the particular purpose for which the filter assembly 10 is intended.

By reducing the transmission of the light through the non-diffusing section 16, an increased exposure must be given for the photographic film, and since the transmission in the example given is 50 percent, the photographer should open the lens one stop, or double the exposure time. Since the exposure time is often determined by other factors, such as by the use of electronic flash, the customary method of compensating for the filter assembly 10 is to open the diaphragm of the lens one stop.

In most circumstances where the background is darker, and particularly in the case of color photographs where it is desirable to have the color of the background predominate over the color of the clothing of the subject, the diffusion will normally be somewhat greater. Furthermore, in order to prevent the diffused area from being lighter than the non-diffused area, the transmission of the diffusing section 15 and the non-diffusing section 16 must be substantially balanced. Under such conditions, it has been found best to provide both of these sections with a transmission of substantially 50 percent. It will be appreciated, of course, that the use of the filter designed for medium backgrounds will likewise require that the lens be opened up one stop, or that the exposure be doubled, to compensate for the decreased transmission of the vignette filter 10.

There are times when it is desirable to have the vignetting effect present on the sides as well as across the bottom of the picture, as may occur when a portrait is taken outdoors, against a background of trees, flowers, etc. While the filter assembly 10 is very effective, the particular shape illustrated in FIG. 3 may not be most suitable for some particular purposes. Under such conditions, it may very well be that the diffusing areas should extend up along each side, as well as across the bottom, and this can be accomplished by using a pair of filters. Such an arrangement is indicated in FIG. 6, where the rear or front filter 30 has been rotated counterclockwise, in the direction of the arrow, while the rear filter 31 has been rotated clockwise, in the direction of the arrow adjacent it. By rotating one or both filters, a wide variety of results are obtainable.

The use of a pair of filters, as indicated in FIG. 6, should not require a further increase in exposure, since this might be too restrictive in the fields in which they can be used. Preferably, the second filter 31 has a greater light transmission than the previously described filters, and generally it has been found desirable to have the non-diffusing section 16 transmit approximately 90 percent of the light falling upon it, while the diffusing section 15 transmits about 75 percent of the light.

As is customary in good filter design, the diffusing section 15 and the non-diffusing section 16 are both cemented to the supporting plate 18. This means that if desired, the reduction in light transmission, or filter action, can be achieved by coloring the cement used to secure the non-diffusing section 16 to the supporting plate 18. Alternatively, the glass plate forming the non-diffusing section 16 may be colored to provide the desired light transmission. Obviously, any desired combination of colored glass and colored cement may be used.

Normally, it is not necessary to decrease the light transmission through the diffusing section 15 of the filter assembly 10 other than by that decrease caused by the roughening of the surface. In some cases, however, the transmission through the diffusing section 15 may need to be reduced, in which case either a colored cement or a colored glass forming the diffusing section 15 may be used.

While the term "colored" has been used in referring to the decrease in light transmission of the diffusing section 15 and the non-diffusing section 16, it should be remembered that the filter assembly 10 may very well be used with color films, and consequently the filter itself should not be selective in its transmission of colors, but should be a neutral density filter. Thus, the filter 10 presents generally a rather grey appearance, suitable for exposing both color and black and white films through it.

From the foregoing, it will be seen that there has been shown and described a vignetting filter fully capable of achieving the results and securing the advantages heretofore set forth. While a preferred form of the invention has been shown and described, it will be appreciated that changes may be made without departing from the broad concept of the invention as herein set forth. Consequently, while an efficient and effective form of the device has been shown, the claims are not to be limited to the particular form or arrangement of parts herein described and shown, except as limited by the claims.

I claim:

1. A photographic filter for attachment to a lens, which includes:
   a non-diffusing section adapted to transmit an undistorted image to a lens;
   a diffusing section adjacent said non-diffusing section, adapted to diffuse light passing through said diffusing section so that said light cannot be focussed to form an image of an object materially spaced from said diffusing section;
   means holding said diffusing section and said non-diffusing section adjacent each other and spaced from said lens, said object, and said image; and
   the light transmission of said non-diffusing section having a preselected ratio to the light transmission of said diffusing section.

2. A filter as defined in claim 1 in which said means holding said sections adjacent each other is a transparent supporting sheet cemented to both said sections.

3. A filter as defined in claim 1 in which the light transmission through said diffusing section is about 50 percent, and the light transmission through said non-diffusing section is about 50 percent.

4. A filter as defined in claim 1 in which the light transmission through said diffusing section is about 70 percent and the light transmission through said non-diffusing section is about 50 percent.

5. A filter as defined in claim 1 in which the light transmission through said diffusing section is about 75 percent and the light transmission through said non-diffusing section is about 90 percent.